(12) United States Patent
Graham

(10) Patent No.: US 6,234,108 B1
(45) Date of Patent: May 22, 2001

(54) VOLTAGE COMPENSATION CIRCUIT AND METHOD FOR REDUCING ELECTRIC SHOCKS TO TEATS OF AN ANIMAL DURING ITS MILKING

(75) Inventor: Martin H. Graham, Berkeley, CA (US)

(73) Assignee: And Yet, Inc., Berkeley, CA (US)

( * ) Notice: Subject to any disclaimer, the term of this patent is extended or adjusted under 35 U.S.C. 154(b) by 0 days.

(21) Appl. No.: 09/287,529

(22) Filed: Apr. 7, 1999

(51) Int. Cl.⁷ .................................. A01J 7/00; A01J 5/00
(52) U.S. Cl. ...................................... 119/14.03; 119/14.08
(58) Field of Search .............................. 119/14.03, 14.08, 119/14.14

(56) References Cited

U.S. PATENT DOCUMENTS

| | | | |
|---|---|---|---|
| 3,773,016 | * 11/1973 | Needham et al. | 119/14.08 |
| 3,874,337 | * 4/1975 | Unbaugh et al. | 119/14.15 |
| 4,355,595 | * 10/1982 | Ackerman et al. | 119/14.03 |
| 4,401,055 | * 8/1983 | Street et al. | 119/14.03 |
| 4,551,633 | * 11/1985 | Winter et al. | 307/147 |
| 5,465,051 | 11/1995 | Graham . | |
| 5,487,359 | * 1/1996 | Montreuil | 119/14.17 |

OTHER PUBLICATIONS

"Milking Systems and Milking Management," Northeast Regional Agricultural Engineering Services, Proceedings from the Milking Systems and Milking Management Symposium, Harrisburg, PA, Jan. 13–14, 1988, pp. 10, 24–28 and 34–39.

* cited by examiner

Primary Examiner—Thomas Price
(74) Attorney, Agent, or Firm—Coudert Brothers

(57) ABSTRACT

A voltage compensation circuit is coupled to a conventional milking system so that when a milk stream flows from a cow to a milk pipeline, a voltage compensation circuit makes contact with the milk stream. As a result, due to the voltage compensation circuit's output voltage, a current that might be generated by the electric potential difference between the cow and the milk pipeline is prevented from flowing within the milk stream. Accordingly, electric shocks to the cow are effectively prevented.

20 Claims, 7 Drawing Sheets

VOLTAGE COMPENSATION CIRCUIT AND METHOD FOR REDUCING ELECTRIC SHOCKS TO TEATS OF AN ANIMAL DURING ITS MILKING

FIELD OF THE INVENTION

The invention generally relates to a milking system, and more specifically to a milking system for reducing electric shocks to animals.

BACKGROUND OF THE INVENTION

Stray voltages have been identified on farms that raise cows. Stray voltages may arise from the utility power distribution system In addition, electrical faults of electrical equipment, such as poor electrical connections, corrosion of switches, and frayed insulation, may also create stray voltages.

Because of stray voltages, a voltage potential may be introduced across a cow. As a result, electric shocks are applied to the cow, and more specifically, to the teat of the cow. Although the cow is not necessarily injured physically, the cow will react negatively during milking and tend to withhold its milk. In addition, the cow may become conditioned to the adverse environment and as a result may resist with physical violence against being moved into the milking area.

FIG. 1 illustrates an example of a conventional milking system 800 that is attached to a cow 810 when milking is performed on the cow 810. The conventional milking system 800 includes at least one liner 860 connected between a teat 840 of the cow 810 and a claw 870, a flexible plastic tube 880 connected between the claw 870 and a stainless steel, milk pipeline 820, and a milk tank 830 into which the pipeline 820 deposits milk from the cow 810 and other cows that are indicated by X's. Typically, the milk tank 830 is remotely located from the cows.

FIG. 2 is an enlarged view of a conventional milking system 100 that is attached to a teat 40 of a cow (not shown). In FIG. 2, a rubber liner 42 is connected between the teat 40 and one of four milk receiving holes 48 of a claw 50. Note that only two admission holes of the claw 50 are shown. In addition, the rubber liner 42 is partially surrounded by a shell 72 that is typically formed from aluminum or stainless steel. The enclosure 72 has a suction hole 71 connected to one of four air admission holes 46 of the claw via a flexible plastic tube 70. Note that only two air admission holes are illustrated. With respect to the claw 50, it also has two pulsation holes 43 that are connected to a pulsator (not shown) that is in turn connected to a vacuum (not shown). Although FIG. 1 only shows the connection between the claw 50 and only one teat 40 of the cow, up to four teats may be connected to the claw 50 for milking. Typically one claw is used for each cow.

When milking is desired, the vacuum is turned on and operated in conjunction with the pulsator so as to produce pressure changes within the enclosure 72. As a result, the rubber liner 42 is caused to squeeze and then release the teat 40. Consequently, milk 44 comes out of the teat 40 and a milk stream 45 moves along the rubber liner 42 toward the milk receiving hole 48 and into a milk chamber 47 of the claw 50. As explained above, other teats of the cow also provide milk through the other milk receiving holes 48 of the claw 50 so that the milk chamber 47 usually has some milk deposited therein. To drain the milk chamber 47, the milk chamber 48 has a duct 52 connected to a tube flexible plastic tube 54 for transporting the deposited milk to a milk pipeline (not shown) that also receives milk from other cows via flexible plastic tubes similar to the flexible plastic tube 54. The milk within the milk pipeline eventually is deposited into a remote milk tank.

As the deposited milk within the milk chamber 47 is drained through the flexible plastic tube 54, a continuous milk stream is formed from the milk chamber 47 to the milk tank. This milk stream provides a conducting path for any current that may be generated by a voltage potential difference between the cow and the milk pipeline. As a result, an electric shock is applied to the teat 40 of the cow when the milk 44 makes contact with the milk stream 45 flowing to the milk chamber 47.

As apparent from the above discussion, a need exists for a milking system and a method that reduces electric shocks to the cow when milking is performed on the cow.

SUMMARY OF THE INVENTION

It is a general object of the present invention to provide a milking system having a voltage compensation circuit that reduces electric shocks to animals when milking is performed on such animals.

It is another object of the present invention to provide a voltage compensation circuit adapted for use with current milking systems.

It is another object of the present invention to provide a voltage compensation circuit that is simple and inexpensive to produce.

These and additional objects are accomplished by a voltage compensation circuit adapted for use with the current, conventional milking system. The voltage compensation circuit is coupled to a tube, such as the flexible plastic tube 54 of FIG. 2. When the milk stream flows through the tube from the cow to the milk pipeline, the voltage compensation circuit makes direct contact with the milk stream. By monitoring potential differences along the milk stream, the current from the cow to the milk pipeline is prevented by the voltage compensation circuit so that the electric shock to the cow is effectively eliminated.

Additional objects, features and advantages of the present invention will be understood form the following description of the preferred embodiments, which description should be taken in conjunction with the actual drawings.

DETAILED DESCRIPTION OF THE PREFERRED EMBODIMENTS

Figure 1:
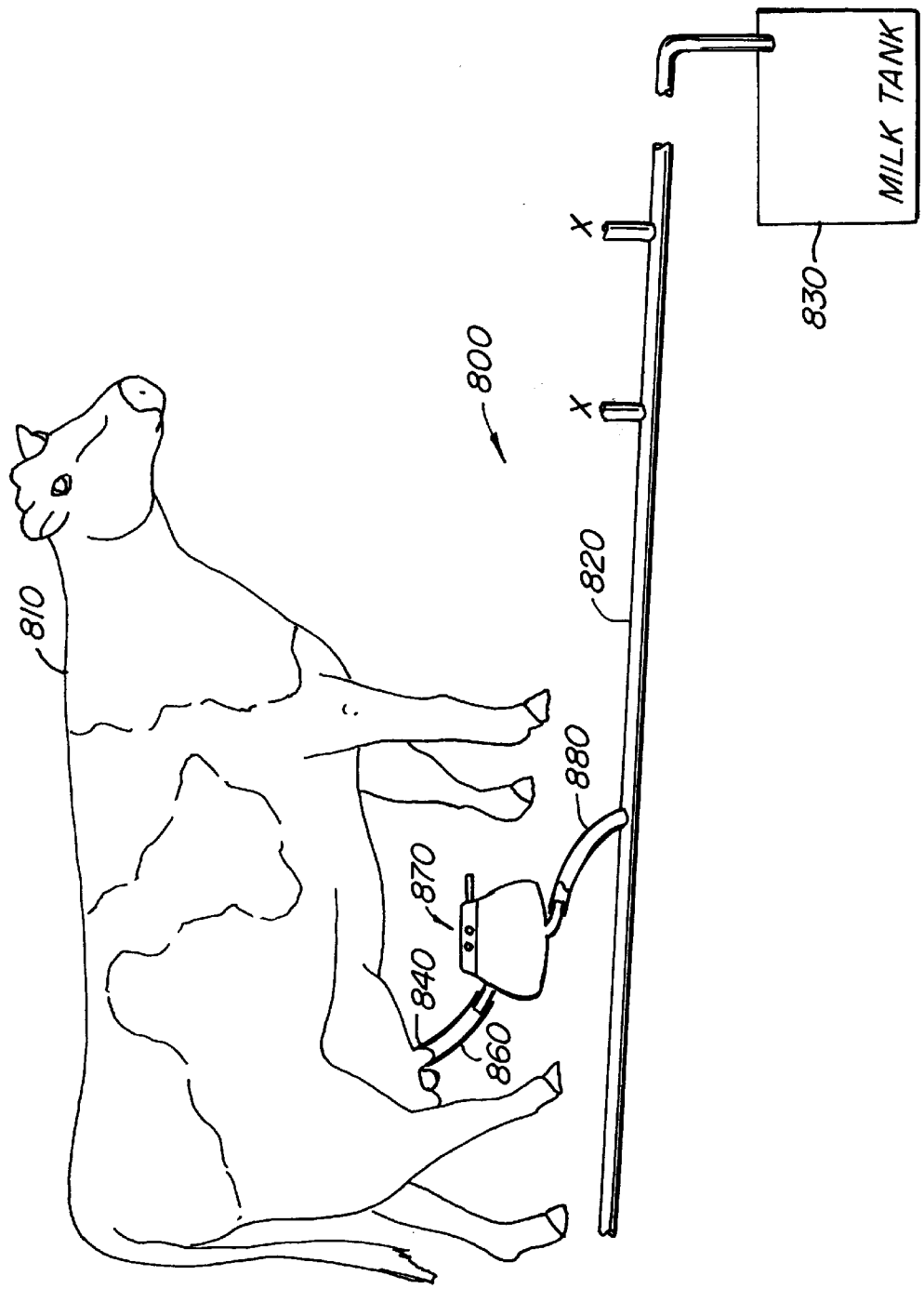
FIG. 1 illustrates an example of a conventional milking system that is attached to a cow when milking is performed on the cow.
Figure 2:
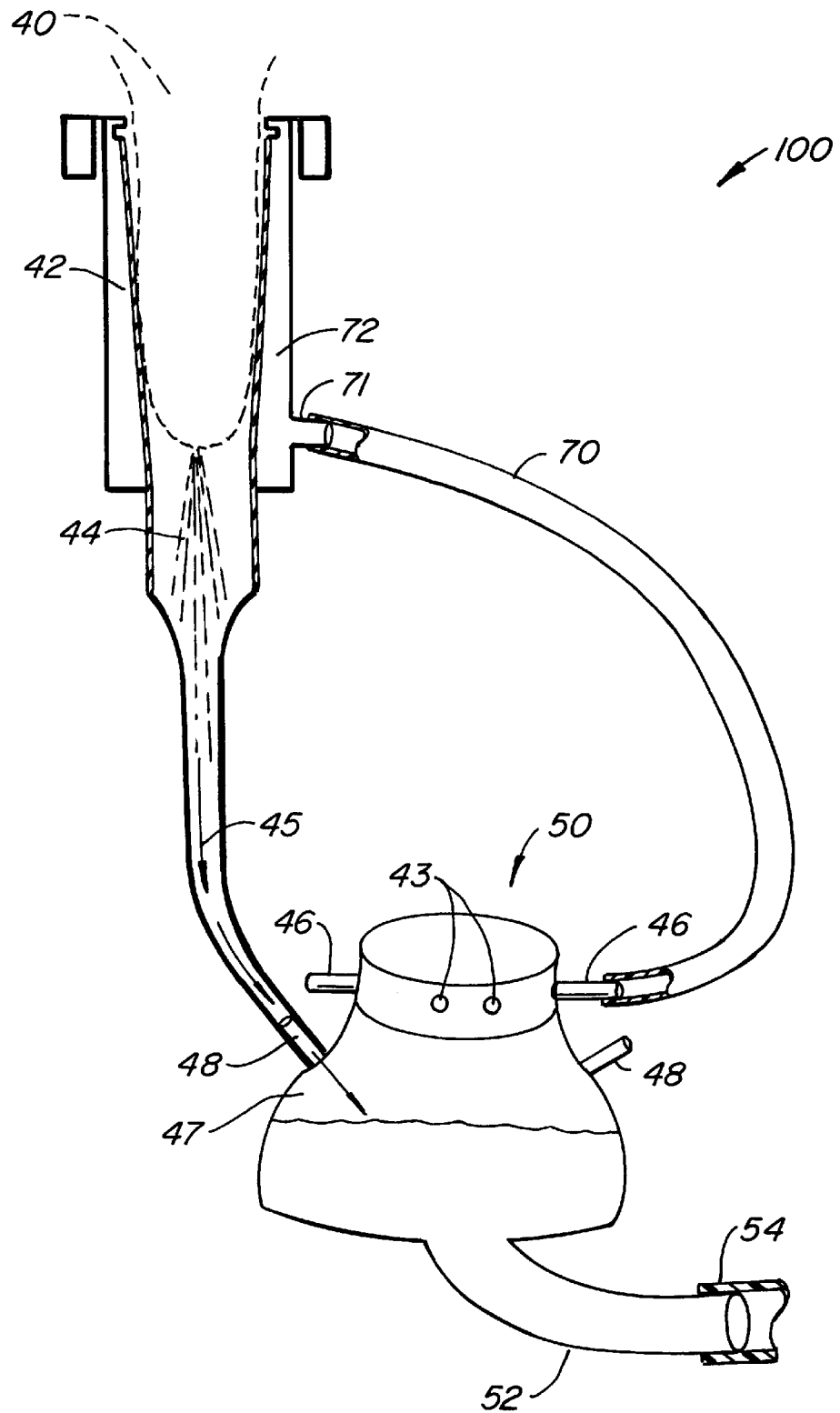
FIG. 2 is an enlarged view of a conventional milking system that is attached to a teat of a cow when milking is performed on the cow.
Figure 3:
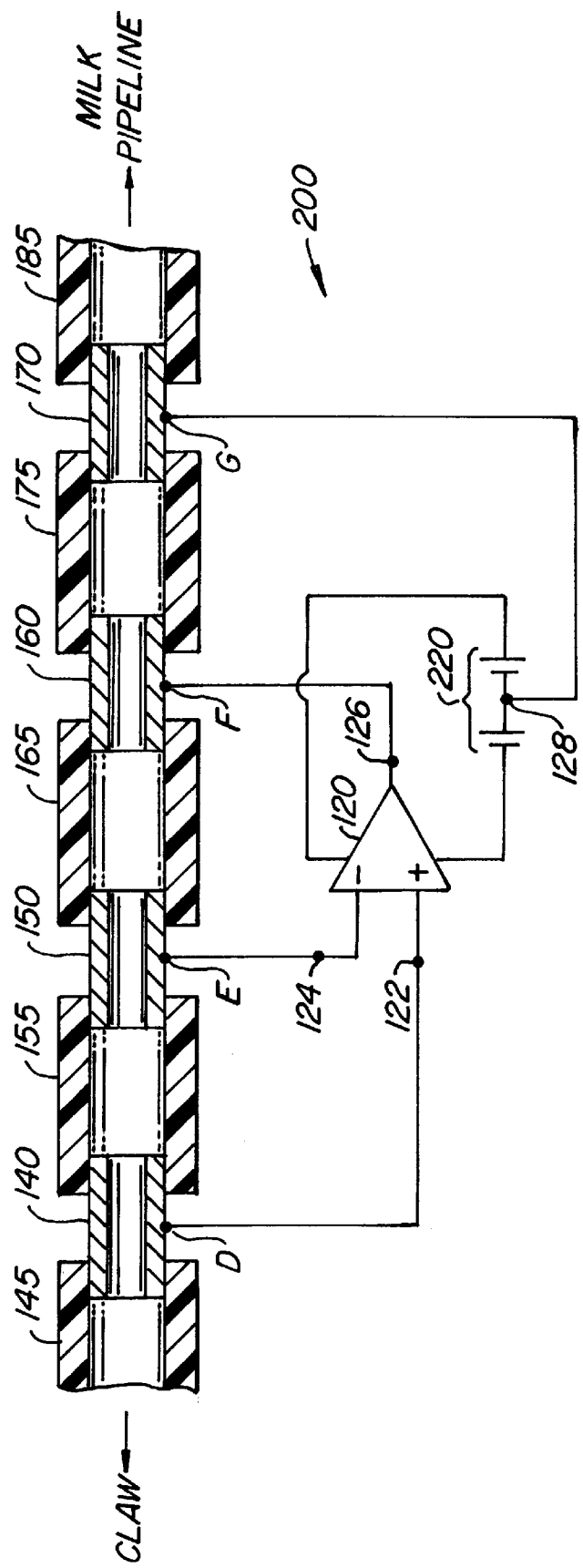
FIG. 3 illustrates a first preferred embodiment of a voltage compensation circuit of the present invention being used in conjunction with the conventional milking system of FIG. 2.

FIG. 3 illustrates the first preferred embodiment of the present invention. In FIG. 3, a voltage compensation circuit 200 is being used in conjunction with the conventional milking system such as the one disclosed in FIG. 2. The voltage compensation circuit 2 includes four pipe portions 140, 150, 160 and 170 and an operational amplifier 120. The four pipe portions 140, 150, 160, and 170 are coupled to the flexible plastic tube which is connected between the duct of the claw and the milk pipeline. To implement the coupling of pipe portions 140, 150, 160, and 170 to the flexible plastic tube, the unitary, flexible plastic tube of the conventional milking system is divided into five flexible plastic tubal portions 145, 155, 165, 175, and 185. With respect to their connections, the tube portion 145 is connected between the duct of the claw (not shown) and the pipe portion 140. The tube portion 155 is connected between the pipe portions 140 and 150. The tube portion 165 is connected between the pipe portions 150 and 160. The tube portion 175 is connected between the pipe portions 160 and 170. And the tube portions 185 is connected between the tube portion 170 and the milk pipeline. Alternatively, electrodes may be placed inside the flexible plastic tube instead of using the pipe portion 140, 150, 160, and 170 as shown.

With respect to the operational amplifier 120, it has a non-inverting terminal 122 connected to the pipe portion 140 at a node D, an inverting terminal 124 connected to the pipe portion 150 at a node E, and an output terminal 126 connected to the pipe portion 160 at a node F. In addition, the operational amplifier 120 is powered by a power-supply 220 and has a floating, output voltage reference 128 that is connected to the pipe portion 170 at a node G. In this preferred embodiment, the supply voltages to the operational amplifier are −6 volts and +6 volts.

The operation of the voltage compensation circuit 200 of FIG. 3 is explained below with respect to FIG. 4. Before the operation is discussed in detail, it is worthwhile to briefly mention the general theory of operational amplifiers. It is well known that the output voltage of an operational amplifier is equivalent to some gain multiplied by the voltage potential difference between the non-inverting and inverting input voltages.

Figure 4:
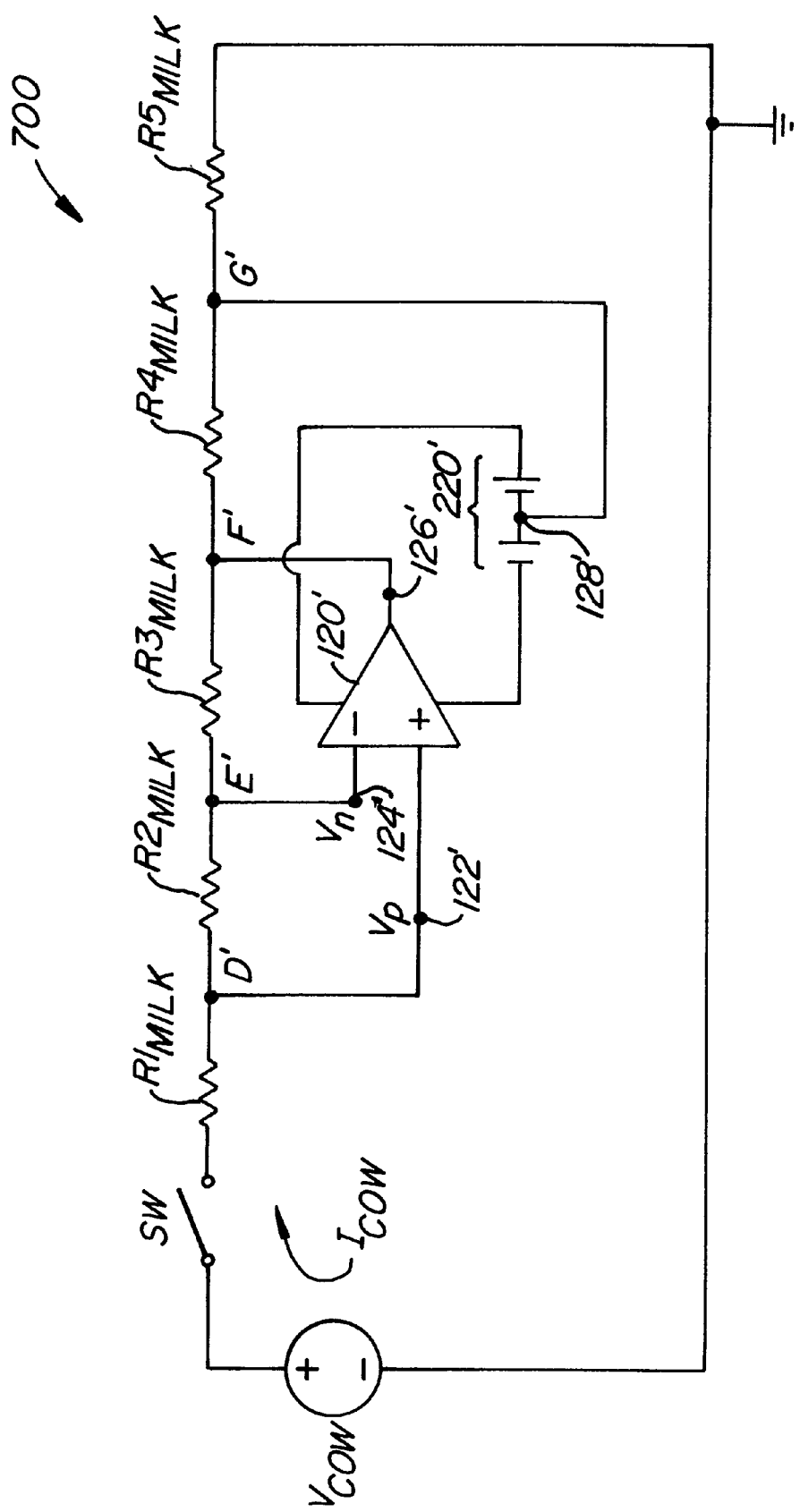
FIG. 4 illustrates an electrical circuit diagram of the voltage compensation circuit of FIG. 3.

FIG. 4 illustrates an electrical circuit diagram 700 that represents the voltage compensation circuit 200 of FIG. 3 coupled to the conventional milking system of FIG. 2. Thus, in FIG. 4, reference characters with a prime affixed indicate parts that are similar to those parts illustrated in FIG. 3. Additionally, FIG. 4 is explained by referring to reference characters of FIGS. 2 and 3.

The electrical circuit diagram 700 indicates a voltage potential of the cow ("$V_{cow}$") and a current ("$I_{cow}$") that is the current generated by the potential difference between the cow and the milk pipeline. The electrical circuit diagram 700 also includes resistances $R1_{milk}$, $R2_{milk}$, $R3_{milk}$, $R4_{milk}$, and $R5_{milk}$ representing the resistances of various sections of the milk stream (not shown) which flows from the milk chamber 47 of the claw 50 to the milk pipeline. Moreover, the electrical circuit diagram 700 also has a switch ("SW") representing an intermittent conduction path between the teat 40 of the cow and the milk stream. When the SW is opened, it denotes that there is no milk 44 from the teat 40 of the cow to the milk chamber 47 of the claw 50. When the SW is closed, it indicates that there is an electrical conduction path between the teat 40 of the cow to the milk stream. Furthermore, the electrical circuit diagram 700 also includes an operational amplifier 120', its power supply 220', and an output voltage reference 128' that are coupled to the conventional milking system at respective nodes D', E', F', and G' as explained above for FIG. 3.

Without the operational amplifier 120', an electric shock is applied to the teat 40 of the cow when the SW is closed due to $I_{cow}$ being conducted from the cow to the milk pipeline via the milk stream. However, when the operational amplifier 120' is in place, the operational amplifier 120' operates so as to prevent or substantially eliminate such electric shock to the cow as explained below.

With respect to the operation of the electrical circuit diagram 700 of the present invention, when there is a milk stream flowing from the cow to the milk tank via the flexible plastic tubal portions and the pipe portions, a non-inverting input voltage ("$V_p$") at the node D' is applied to a non-inverting terminal 122' while an inverting input voltage ("$V_n$") at the node E' is applied to an inverting terminal 124'. As a result, the operational amplifier 120' outputs an output voltage ("$V_{out}$") at its output terminal 126'. Because of the voltage amplification due to the operational amplifier 120', $V_{out}$ acts as a negative feedback return to the input voltage of the operational amplifier ("$V_{in-op}$"), which is $V_p$ minus $V_n$. Due to this negative feedback connection, $V_{in-op}$ is maintained substantially zero. By maintaining $V_{in-op}$ at zero volt, there will be no current flowing from the node D' to the node E' due to the well-known Ohm's Law of "V=IR". Hence, $I_{cow}$ will be reduced to essentially zero. Accordingly, the voltage compensation circuit 200 substantially eliminates electric shocks to teats of the cow because it effectively prevents the conduction of current from the cow to the milk pipeline.

Figure 5:
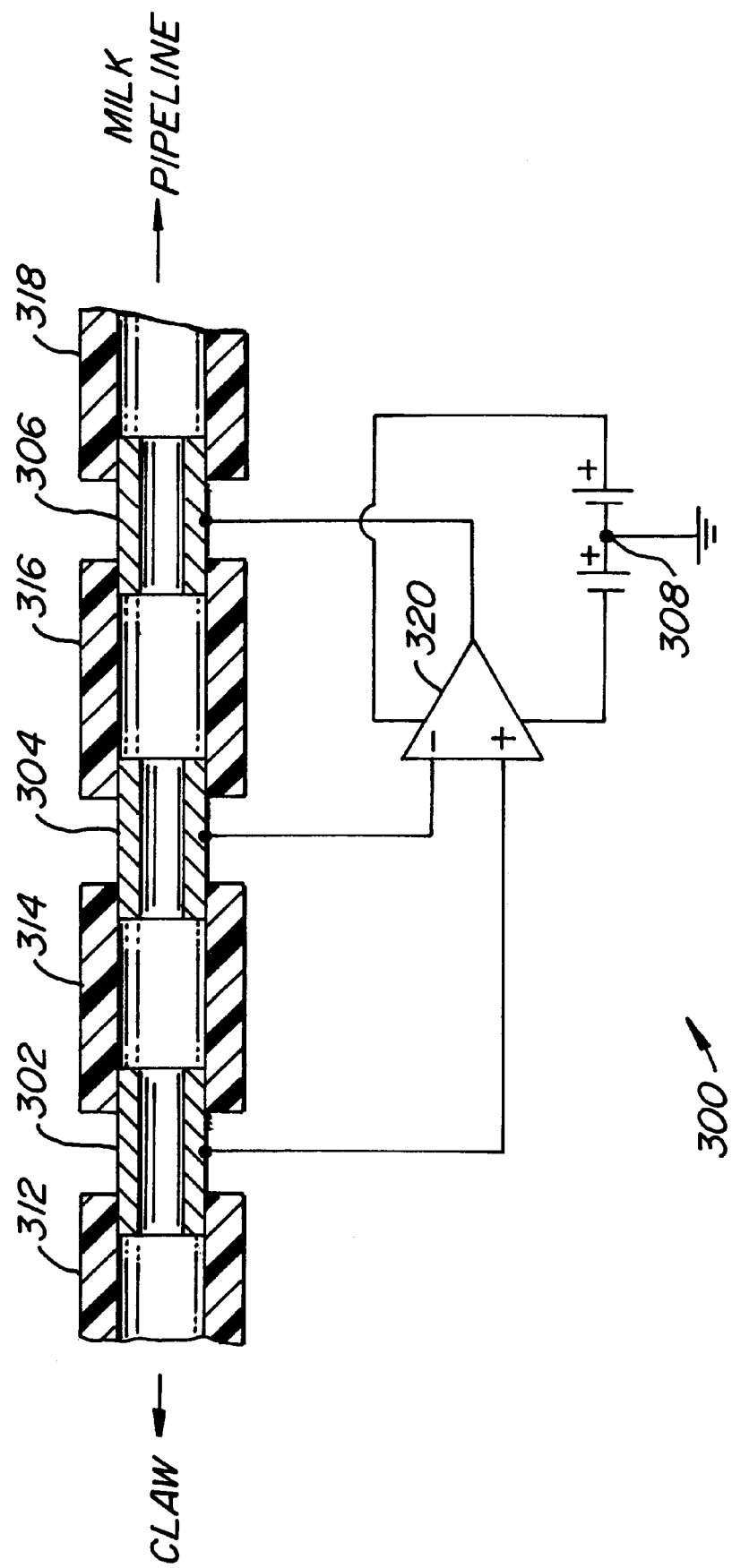
FIG. 5 illustrates a second preferred embodiment of a voltage compensation circuit of the present invention being used in conjunction with the conventional milking system of FIG. 2.

FIG. 5 illustrates a second preferred embodiment of the present invention. In FIG. 5, a voltage compensation circuit 300 of the present invention is being used in conjunction with a prior art milking system such as the one disclosed in FIG. 2. The voltage compensation circuit of FIG. 4 is substantially similar to the voltage compensation circuit 200 of FIG. 3 except for two aspects. First, the voltage compensation circuit 300 only has three pipe portions 302, 304, and 306 that are coupled to only four flexible plastic tubal portions 312, 314, 316, and 316. And second, an output voltage reference 306 with respect to an output terminal of an operational amplifier 320 is electrically connected to a system ground as apparent from the absence of a fourth pipe portion. By connecting the output voltage reference of the operational amplifier to the system ground, only one power supply is necessary for providing the power to all voltage compensation circuits that are individually coupled to each flexible plastic tube which is connected to each duct of each claw used for each cow.

With respect to the operation of the voltage compensation circuit 300 of FIG. 5, the above, described operational features of the voltage compensation circuit 200 of FIG. 4 applies.

Figure 6:
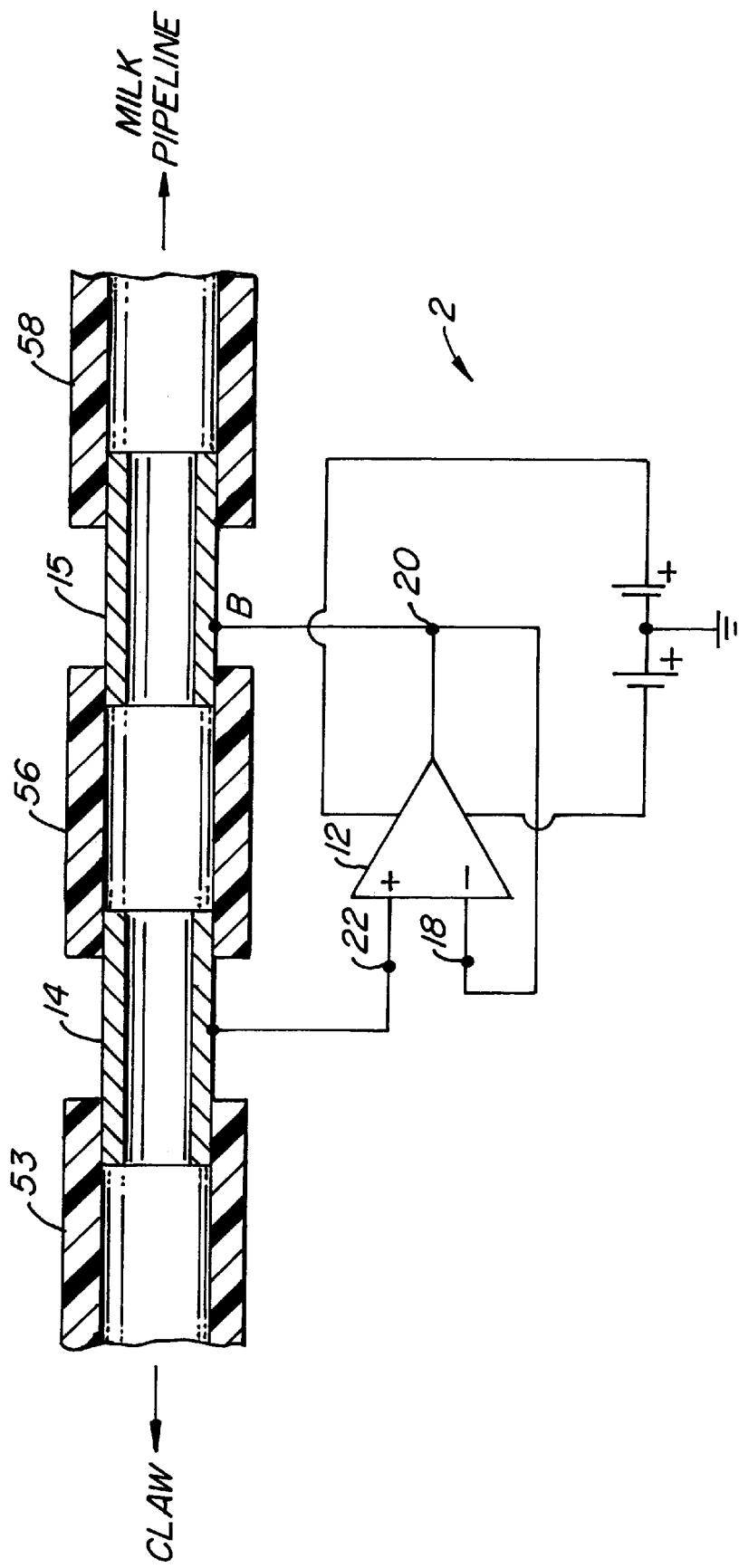
FIG. 6 illustrates a third preferred embodiment of a voltage compensation circuit of the present invention being used in conjunction with the conventional milking system of FIG. 2.

FIG. 6 illustrates a third preferred embodiment of the present invention. In FIG. 6, a voltage compensation circuit 2 of the present invention is being used in conjunction with a conventional milking system such as the one disclosed in FIG. 2. The voltage compensation circuit of FIG. 6 is substantially similar to the voltage compensation circuit 300 of FIG. 5 except for two aspects. First, the voltage compensation circuit 2 only has two pipe portions 14 and 15 that are coupled to only three flexible plastic tubal portions 53, 56, and 58. And second, an inverting terminal 18 of an operational amplifier 12 is connected to an output terminal 20 of the operational amplifier 12.

With respect to the operation of the electrical circuit diagram 6 of the present invention, when there is a milk stream flowing from the cow to the milk pipeline via the flexible plastic tubal portions and the pipe portions, a non-inverting input voltage at a node A is applied to a non-inverting terminal 22 of the operational amplifier 12. As a result, the voltage compensation circuit 2 essentially operates as a voltage follower because its inverting and output terminals 18 and 20, respectively, are connected together. That is, the output voltage of the operational amplifier 12 at its output terminal 20 or at a node B is equivalent to the non-inverting input voltage. As a result, there is no current flowing from the node A to the node B due to the Ohm's Law. Accordingly, the voltage compensation circuit 2 substantially eliminates electric shocks to teats of the cow because it effectively prevents the conduction of current from the cow to the milk tank.

Figure 7:
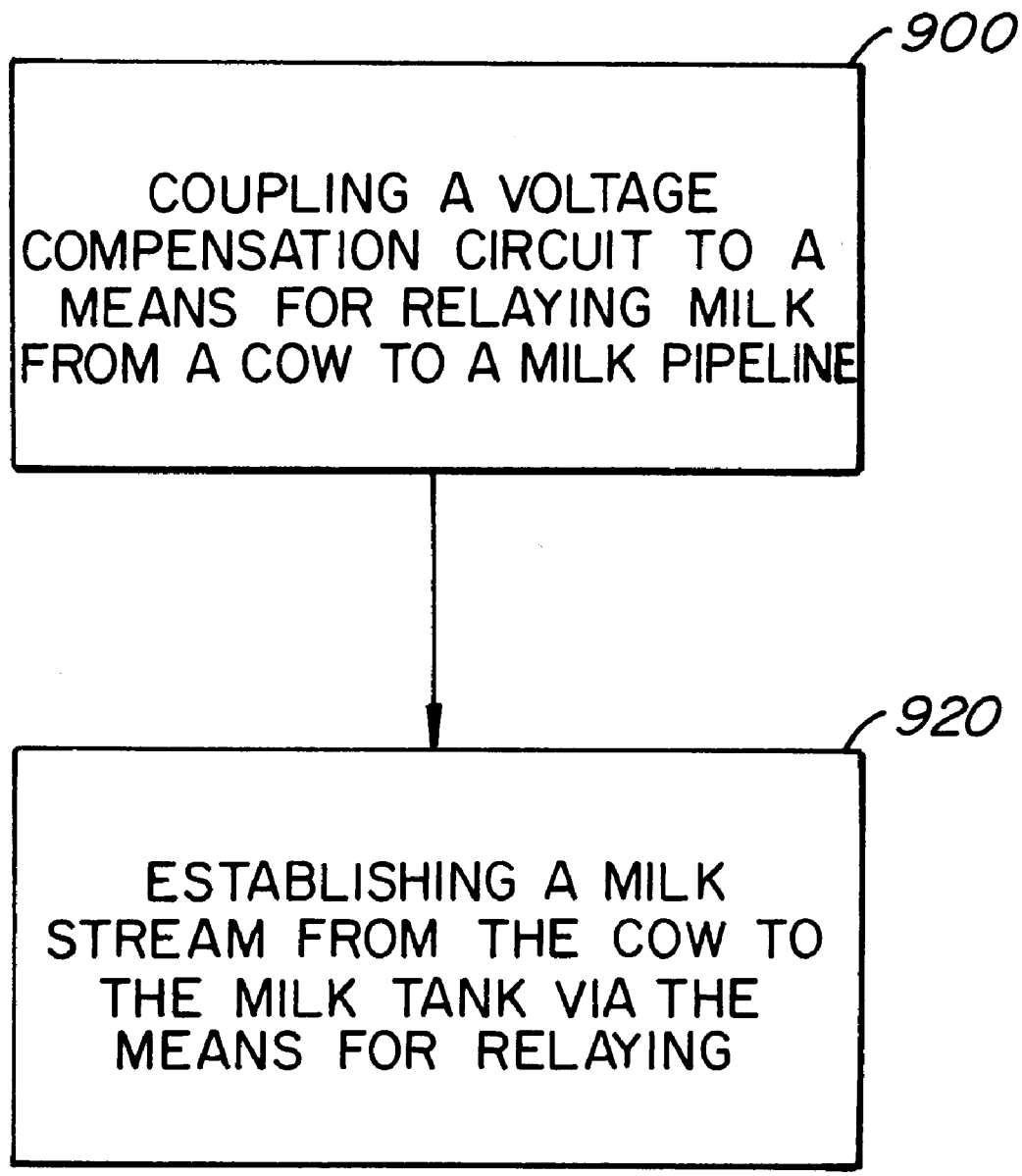
FIG. 7 illustrates a flow chart of a method for reducing electric shocks to a cow when milking is performed on the cow.

FIG. 7 illustrates a flow chart of a method of reducing an electric shock to an cow due to a current flow that is generated by a voltage potential difference between the cow and a milk pipeline when milking is performed on the cow. In step 900, a voltage compensation circuit is coupled to a means for relaying milk from the cow to a remote milk tank via the milk pipeline. In the preferred embodiment, the means for relaying includes rubber liners, a claw, a pulsator, a vacuum, and a flexible plastic tube. The voltage compensation circuit is preferably coupled to the flexible plastic tube. Furthermore, the voltage compensation circuit preferably includes at least two electrodes or stainless steel pipe portions and an operational amplifier. These two electrodes are coupled to the flexible plastic tube of the milking system while the operational amplifier is connected to these two electrodes. In step 920, a milk stream is established from the cow to the milk pipeline via the means for relaying such that the voltage compensation circuit prevents the flow of current from the cow to the milk collection area when the milk stream contacts the voltage compensation circuit. In other words, the conduction of the current is substantially reduced or eliminated.

With the present invention has been described in conjunction with the above preferred embodiments, these embodiments are offered by way of illustration rather than by way of limitation. Those skilled in the art will be enabled by this disclosure to make various modifications and alterations to the preferred embodiments described without departing from the spirit and scope of the present invention. Accordingly, these modifications and alterations are deemed to lie within the spirit and scope of the present invention as specified by the appended claims.

I claim:

1. A milking system for reducing an electric shock to an animal due to a conduction of a current generated by a potential difference between the animal and a milk pipeline when milking is performed on the animal, which comprises:
   a relaying system for relaying milk from the animal such that a milk stream is formed from the animal to the milk pipeline flowing through a first point and a second point; and
   a voltage compensation circuit coupled to the relaying system, wherein the voltage compensation circuit applies a voltage generated to the second point based on a first voltage at the first point, thereby reducing a voltage difference between a second voltage at the second point and the first voltage.

2. The milking system of claim 1, wherein the voltage compensation circuit has at least two electrodes coupled to the relaying system and an operational amplifier connected to the at least two electrodes.

3. The milking system of claim 2, wherein the operational amplifier has a non-inverting input, an inverting input, and an output, wherein the non-inverting input is connected to a first electrode of e at least two electrodes, wherein the inverting input is connected to the output, wherein the output is connected to a third electrode of the at least two electrodes, and wherein the first electrode and the second electrode contact the milk stream in respective order away from the animal.

4. The milking system of claim 3, wherein each of the first electrode and the second electrode is a pipe portion coupled to the relaying system.

5. The milking system of claim 2, wherein the operational amplifier has a non-inverting input, an inverting input, and an output, wherein the non-inverting input is connected to a first electrode of the at least two electrodes, wherein the inverting input is connected to a second electrode of the at least two electrodes, wherein the output is connected to a second electrode of the at least two electrodes, and wherein the first electrode, the second electrode, and the third electrode contact the milk stream in respective order away from the animal.

6. The milking system of claim 5, wherein each of the first electrode, the second electrode and the third electrode is a pipe portion coupled to the relaying system.

7. The milking system of claim 2, wherein the operational amplifier has a non-inverting input, an inverting in and an output, wherein the non-inverting input is connected to a first electrode of the at least two electrodes, wherein the inverting input is connected to a second electrode of the at least two electrodes, wherein the output is connected to a third electrode of the at least two electrodes, said operational amplifier being powered by a power supply having a reference ground, wherein said reference ground is connected to a fourth electrode of the at least two electrodes, and wherein the first electrode, the second electrode, the third electrode and the fourth electrode contact the milk stream in respective order away from the animal.

8. The milking system of claim 7, wherein each of the first electrode, the second electrode and the third electrode is a pipe portion coupled to the relaying system.

9. The milking system of claim 1, wherein the animal is a dairy cow.

10. The milking system of claim 1, wherein the relaying system comprises:
    liners connecting between teats of the animal and a claw, wherein the claw is adapted to cause the liners to open and close around the teats of the animals; and
    a tube connecting between a duct of the claw and the milk pipeline, wherein the voltage compensation circuit is coupled to the tube.

11. A method of reducing an electric shock to an animal due to a conduction of a current generated by a voltage potential difference between the animal and a milk pipeline when milking is performed on the animal, which comprises steps of:
    coupling a voltage compensation circuit to a relaying system for relaying milk from the animal to the milk pipeline;
    establishing a milk stream from the animal to the milk pipeline flowing through a first point and a second point via the relaying system, and applying a voltage generated to the second point based on a first voltage at the first point, thereby reducing a voltage difference between a second voltage at the second point and the first voltage.

12. The method of claim 11 further comprising a step of providing a voltage compensation circuit having at least two electrodes and an operational amplifier, wherein the at least two electrodes are coupled to the relaying system and the operational amplifier is connected to the at least two electrodes.

13. The method of claim 12 further comprising steps of:

connecting a non-inverting input of the operational amplifier to a first electrode of the at least two electrodes;

connecting an output of the operational amplifier to a second electrode of the at least two electrodes; and connecting an inverting input of the operational amplifier to the output of the operational amplifier, wherein the first electrode and the second electrode contact the milk stream in respective order away from the animal.

14. The method of claim 12 further comprising steps of:
connecting a non-inverting input of the operational amplifier to a first electrode of the at least two electrodes;

connecting an inverting input of the operational amplifier to second electrode of the at least two electrodes; and connecting an output of the operational amplifier to a third electrode of the at least two electrodes, wherein the first electrode, the second electrode and the third electrode contact the milk stream in respective order away from the animal.

15. The method of claim 12 further comprising steps of:

connecting a non-inverting input of the operational amplifier to a first electrode of the at least two electrodes;

connecting an inverting input of the operational amplifier to second electrode of the at least two electrodes; and connecting an output of the operational amplifier to a third electrode of the at least two electrodes, wherein said operational amplifier is powered by a power supply having a reference ground, wherein the reference ground of the power supply is connected to a fourth electrode of the at least two electrodes, and wherein the first electrode, the second electrode, the third electrode and the fourth electrode contact the milk stream in respective order away from the animal.

16. The method of claim 11 further comprising a step of providing a voltage compensation circuit having at least two stainless steel pipe portions and an operational amplifier, wherein the at least two stainless steel pipe portions are coupled to the relaying system and the operational amplifier is connected to the at least two stainless steel pipe portions.

17. The method of claim 16 further comprising steps of:

connecting a non-inverting input the operational amplifier to a first stainless steel pipe portion of the at least two stainless steel pipe portions;

connecting an output of the operational amplifier to a second stainless steel pipe portion of the at least two stainless steel pipe portions; and connecting an inverting input of the operational amplifier to the output of the operational amplifier, wherein the first stainless steel pipe portion and the second stainless steel pipe portion contact the milk stream in respective order away from the animal.

18. An electric shock eliminator for preventing an electric shock to an animal due to a conduction of a current generated by a potential difference between the animal and a milk pipeline when milking is performed on the animal, wherein a milk stream is established from the animal to the milk pipeline flowing through a first point and a second point when said milking is performed, comprises:

a voltage compensation circuit coupled to the milk stream, wherein the voltage compensation circuit applies a voltage generated to the second point based on a first voltage at the first point, thereby reducing a voltage difference between a second voltage at the second point and the first voltage.

19. The electric shock eliminator of claim 18, wherein the voltage compensation circuit has at least two electrodes coupled to the milk stream and an operational amplifier connected to the at least two electrodes for producing a compensation voltage.

20. The electric shock eliminator of claim 18, wherein said animal is a dairy cow.

* * * * *